July 8, 1947.  B. C. ROEHRL  2,423,663
FILM CARTRIDGE
Filed Sept. 22, 1944
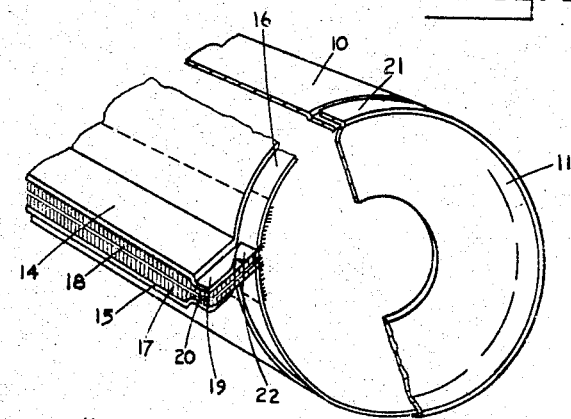
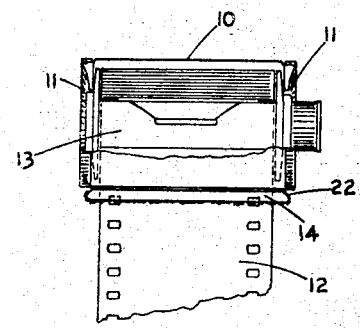
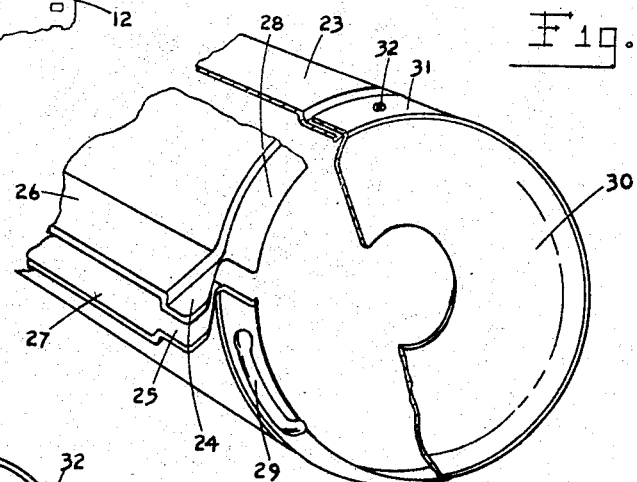
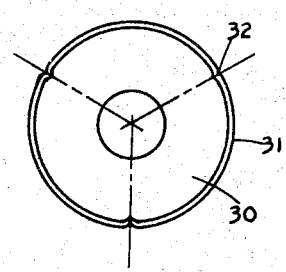
INVENTOR.
BRUNO C. ROEHRL
BY
ATTORNEYS Patented July 8, 1947

2,423,663

UNITED STATES PATENT OFFICE 2,423,663

FILM CARTRIDGE

Bruno C. Roehrl, Binghamton, N. Y., assignor to General Aniline & Film Corporation, New York, N. Y., a corporation of Delaware Application September 22, 1944, Serial No. 555,212

8 Claims. (Cl. 206—52)

This invention pertains to light-tight, roll film cartridges of a type having a cylindrical shell or body at either end of which is attached a cap or cover. These cartridges are well known in the art and are usually employed for roll film of narrow widths such as the well-known 35 mm. film employed in cameras of that size. These cartridges are generally used with film for which there is no protecting or backing strip such as the usual paper strip and, therefore, must be light tight. The film is purchased, loaded, and sealed in the cartridge, or is purchased in bulk, cut, and then loaded by the photographer in a dark room or with the assistance of one of the available daylight loading mechanisms.

Among other objects of the invention is the development of a cartridge which shall be relatively simple in its design, easily and cheaply constructed, and of such design as to obviate clamping or other exercise of unnecessary force on the film which tends to prevent its easy withdrawal from the cartridge, or to hinder rewinding after exposure. It is also an object of the invention to provide a construction which shall be light tight, yet one which will not require end caps of special shape or which require cut-out or recessed portions in them for avoiding the film slot. It is also an object of the invention to provide simple end caps having a complete or non-interrupted rim for engagement with the shell of the cartridge, and to retain those caps in position on the shell by frictional engagement between the metal parts, yet to accomplish that desired result without compressing the part of the cartridge at the slot through which the film is drawn and without preventing easy movement of the film through the slot. It is also an object of the invention to provide a construction as above described in which there is no possibility of light entering at the ends of the slot or at that part of the shell where the caps engage over the divided or split metal at the slot.

Another object of the invention is evident in a modification in which the end caps are retained in place without developing a high degree of friction and without compressing the slot members against the film, but by use of the well-known bayonet joint. This latter connecting means is made possible by the fact that applicant's particular construction makes it unnecssary to notch the caps, and they are, therefore, rotatable on the shell permitting the use of that particular type of joint.

Now referring to the figures of drawing in which details of two cartridges are shown and by reference to which the invention is to be described:

Fig. 1 is an isometric view of a film cartridge, certain parts being broken away thereby to show the construction more clearly.

Fig. 2 is a section through the cartridge illustrated in Fig. 1, showing the film spool and film in place.

Fig. 3 is a view similar to Fig. 1, but showing a modification employing bayonet connections for the end caps.

Fig. 4 is a detail of an end cap for the cartridge of Fig. 3.

Now referring to Figs. 1 and 2, the cartridge comprises a shell or body 10 preferably but not necessarily made of pressed steel or other metal, and end caps 11 which may be of similar material. The cartridge is adapted to be produced of other than metallic materials, for example, plastic, either molded or fabricated by other methods. The film of the 35 mm. or similar type having the usual perforations, and indicated by numeral 12, is wound on a spool 13 having a core and end flanges. The spool is not new and, therefore, need not be described in detail. It is sufficient to say that it is of a size freely rotatable within the space provided by the shell 10 and end caps 11. It has the usual extension and key slot adapted to be engaged by appropriate parts within the camera and by means of which the film may be rewound after exposure.

The shell 10 is split at one side and has a film slot member which comprises the lips 14 and 15 extending more or less tangentially from the cylindrical shell itself. The shell may be of resilient construction and normally would tend to remain in a more opened position, that is, one in which the slot lips would be widely separated, but preferably there is no such tendency and the shell, without end caps in position, assumes the form illustrated, that is, has its slot closed to the fullest extent permitted. When the end caps are forced into position, the shell is held so that the caps may be engaged with the ends of the shell which are necked down as at 16. While that is not absolutely necessary, it tends to strengthen the construction, makes it easier to engage the caps at the ends of the shell and also affords an outside surface which is of uniform diameter, therefore, making it easier to handle the cartridge during loading in the camera, or at other times.

The slot is provided at either side with plush or other soft compressible material between which the film is withdrawn and by means of which the interior of the cartridge is maintained absolutely light tight. This plush material is shown at 17 and 18 and extends along the inner surfaces of the lips 14 and 15 and then within the shell for a short distance. In certain instances it may be desirable to carry the plush or other material clear around the inside of the shell, thereby to provide protection for the film itself. This plush material extends clear to the ends of the lips 14 and 15 which are of substantially the same length as the shell itself.

The width of the film is such that the part of the slot within which it slides is not as long as the shell. At a point beyond the edges of the film, the lips 14 and 15 are offset as at 19 and 20. The offset is of sufficient extent so that, considering the thickness of the plush or other light-tight material, it is impossible to compress the shell so that the lips approach each other closely enough to exert undue force on the film as the same is either withdrawn from or drawn back into the cartridge.

End caps 11 have rims 21 which engage over the cooperating parts 16 of the shell. To allow use of a full or uninterrupted rim on each end cap, the offset parts 19 and 20 of the lips are notched or cut back as at 22 so as to allow these end caps to be pushed firmly into place and also to avoid having to adjust the cap to any particular relative position before applying it to the shell. It is to be borne in mind that these cartridges are loaded and the caps put in place in total darkness in many instances, therefore, ease of manipulation and certainty that the parts are assembled in absolute light-tight relationship is a decided advantage. The plush or other light-sealing material extends outwardly into the notch 22, and when the cap is pushed into position, that plush is merely compressed thereby closing any opening tending to allow light to enter at the corner of the slot. If too much material is left at that particular position for allowing easy application of the end caps, a slit may be made in the plush just deep enough to facilitate assembly.

Now referring to Figs. 3 and 4, a similar but modified construction is evident. In the form of the invention described with respect to Figs. 1 and 2, the end caps are retained in position due to the fact that they are a relatively tight fit over the ends of the shell. The frictional resistance set up is enough to retain those caps, but due to the particular construction of the slot members, there is no possibility of any adverse effect on the movement of the film either in drawing it out of the cartridge or in rewinding it. In the modification shown in Fig. 3, the shell 23 may have an inherent tendency to open up, but preferably does not have that tendency. The shell or body should be so formed when completed that it tends to compress the felt or other light-tight material and to force the offset portions 24 and 25 of the lips 26 and 27 into that position which they occupy when the entire cartridge is assembled. To simplify the illustration, the plush sealing strips are not shown in this figure. They are to be of similar type to those in Fig. 1.

The shell is necked down at 28 and has a plurality of bayonet-type slots 29. As herein contemplated, three such slots are to be used, however, two may be sufficient, or a number greater than three, if so desired. The end caps 30 have rims 31 which are indented as at 32 to form cooperating projections extending inwardly of the cap rims for engagement with slots 29. Of course, the caps 30 are placed so that the projections 32 align with the entering parts of the slots 29 whereupon a twist of the cap member will draw it up tightly on the shell and will seal the end of the slot as in the first instance, Fig. 1, but will also make an effective light seal due to the fact that the cap will be forced tightly against the end of the necked portion 28.

The principles of the invention are applicable to film cartridges such as are manufactured on a production basis and which are sold with film loaded therein, and which are not intended primarily for repeated use as a light-tight container for film to be used in cameras adapted to take film which is not provided with a backing strip. They are equally applicable to cartridges which are sold with the intent that they are to be repeatedly loaded with film and which have an indefinite period of usefulness.

Modifications may include variations in shape in accordance with the requirements of different cameras. It is contemplated that film of any size shall be accommodated by the cartridge although 35 mm. film is at present most commonly sold in such a container. It is not essential that both ends of the container be formed in precisely the same way, although that is preferable. In certain instances, it may be advantageous to construct the cartridge casing with one end closed thereby making it necessary to provide a cap or cover for the other end only. The cap may attach to one end of the shell by either means herein described, and the opposite cap may be differently fixed in place.

While two embodiments of the invention have been disclosed, it is to be understood that the inventive concept may be carried out in a number of ways. This application is, therefore, not to be limited to the precise details described but is intended to cover all variations and modifications thereof falling within the spirit of the invention and the scope of the claims.

I claim:

1. A roll film cartridge comprising a shell and end caps, said shell being formed with spaced lips between which is a film slot, light-sealing means in said slot, the lips and sealing means being of greater length than the width of film to be drawn through the slot and extending closer to the ends of the shell than the innermost extent of the end caps when in place on the shell, and notches cut in the ends of the lips and adjacent the shell to allow assembly of the shell and end caps.

2. A roll film cartridge comprising a shell and end caps, said end caps having non-interrupted rims, said shell having spaced lips to form a film slot, and means at either end of said slot for preventing compression of the slot beyond a predetermined distance including inwardly offset lip ends, light-sealing material at the inner surfaces of both the lips and the offset ends, and notches at the ends of the lips and adjacent the shell for allowing passage of the end cap rims as the caps are assembled on the shell.

3. A roll film cartridge comprising a shell and end caps, said end caps having non-interrupted rims, said shell being formed as a cylinder with a slot extending substantially tangential with respect to the cylindrical portion of the shell and comprising lips between which a film may be withdrawn, each end of the shell being necked down to a smaller diameter for the reception of rims of the end caps, each of the projecting lip members being offset at its end portion and at a position beyond the edges of the film which is to be drawn through the said slot, and a notch at either end of the projecting lips extending to the cylindrical portion of the shell and inwardly over a distance at least equal to the length of the cap rims, thereby to allow assembly of the end caps.

4. A roll film cartridge comprising a shell and end caps, said end caps having non-interrupted rims, said shell being formed with spaced lips between which is a film slot, light-sealing means in said slot, and means at either end of said slot for preventing compression of the lips beyond a predetermined distance thereby to prevent binding of the film as it passes through the slot, a notch at either end of the lips, adjacent the shell, and of a depth sufficient to allow assembly of the end caps in such a manner that they may be rotated on the ends of the shell, and bayonet-type connections for retaining the caps on the shell.

5. A roll film cartridge comprising a shell and end caps having a substantially continuous rim, said shell being cylindrical in form and having a tangentially extending film slot formed from projecting lips bent outwardly from the cylindrical shell, the ends of the shell being necked down for the reception of the end caps, means for preventing compression of the film slot beyond a predetermined extent which includes offset ends of the lip members, means including notches cut in the offset ends of the lip members for allowing assembly of said end caps having a substantially continuous rim, and bayonet-type connections for retaining the end members on the shell and in light-tight cooperation therewith.

6. A roll film cartridge comprising a shell and end caps, said end caps having non-interrupted rims, said shell being formed with spaced lips forming a film slot, light-sealing means in said slot, the lips and sealing means being of greater length than the width of film to be drawn through the slot and extending closer to the ends of the shell than the innermost extent of the end cap rims when in place on the shell ends, means at the ends of the lips to limit the space between them to permit easy movement of film therethrough, the outer diameter of the ends of the shell, when the slot width is a minimum being such that the end caps are securely held in place by frictional engagement only.

7. A roll film cartridge as defined in claim 6 in which the shell has an inherent tendency to open outwardly.

8. A roll film cartridge comprising a shell and end caps, lips forming a film slot projecting from said shell and being of substantially the same length as the shell, said end caps having continuous rims for engagement over the ends of the shell, said lips having a notch at either end adjacent the shell and of a depth to allow complete assembly of the end caps by a rotating movement of the caps with respect to the shell, and cooperating bayonet-type connections on said cap rims and shell ends for retaining the caps on the shell.

BRUNO C. ROEHRL.

REFERENCES CITED

The following references are of record in the file of this patent:

UNITED STATES PATENTS

| Number | Name | Date |
|---|---|---|
| 870,445 | Livermore | Nov. 5, 1907 |
| 1,686,204 | Covert | Oct. 2, 1928 |
| 2,153,573 | Kinloch | Apr. 11, 1939 |
| 2,019,672 | Goodhand | Nov. 5, 1935 |
| 1,353,016 | Bernard | Sept. 14, 1920 |
| 1,987,247 | Schnitzler | Jan. 8, 1935 |

FOREIGN PATENTS

| Number | Country | Date |
|---|---|---|
| 703,087 | Germany | Feb. 28, 1941 |